United States Patent
Izuchukwu et al.

(10) Patent No.: US 6,579,401 B1
(45) Date of Patent: Jun. 17, 2003

(54) METHOD FOR FORMING A POLYMERIC CONTAINER SYSTEM FOR PRESSURIZED FLUIDS

(75) Inventors: John I. Izuchukwu, Wildwood, MO (US); Stan A. Sanders, Chesterfield, MO (US)

(73) Assignee: Mallinckrodt, Inc., St. Louis, MO (US)

( * ) Notice: Subject to any disclaimer, the term of this patent is extended or adjusted under 35 U.S.C. 154(b) by 93 days.

(21) Appl. No.: 09/702,753

(22) Filed: Nov. 1, 2000

(51) Int. Cl.$^7$ .................. B29C 47/02; B29C 49/04; B32B 31/30

(52) U.S. Cl. ............... 156/244.12; 156/244.13; 156/244.14; 156/244.25; 156/292; 156/293; 264/209.3; 264/210.1

(58) Field of Search .............. 156/244.13, 244.12, 156/244.15, 292, 293, 244.25; 264/209.1, 209.3, 209.4, 209.5, 209.8, 210.1, 171.12, 171.26, 172.1, 506, 508, 537, 539

(56) References Cited

U.S. PATENT DOCUMENTS

| | | |
|---|---|---|
| 771,801 A | 10/1904 | Andrew |
| 2,380,372 A | 7/1945 | Alderfer |
| 3,432,060 A | 3/1969 | Cowley |
| 3,491,752 A | 1/1970 | Cowley |
| 4,090,509 A | 5/1978 | Smith |
| 4,181,993 A | 1/1980 | McDaniel |
| 4,253,454 A | 3/1981 | Warncke |
| 4,455,133 A | 6/1984 | Jakob et al. |
| 4,490,203 A | * 12/1984 | Bose .................. 156/251 |
| 4,932,403 A | 6/1990 | Scholley |

(List continued on next page.)

FOREIGN PATENT DOCUMENTS

| | | |
|---|---|---|
| DE | 971689 | 3/1959 |
| DE | 2644806 A1 | 4/1978 |
| DE | 298 13 235 U1 | 12/1998 |
| EP | 0 855 263 A2 A3 | 7/1998 |
| EP | 0 897 791 A2 A3 | 2/1999 |
| JP | 07171882 | 7/1995 |
| WO | WO 99/64345 A1 | 12/1999 |

OTHER PUBLICATIONS

Haub, K, "Blasgeformte TPE–Achsmanschetten: Blow–Moulded TPE Axle Sleeves", *Kunststoffe*, 86, 1996, pp. 332–334.

*Primary Examiner*—Michael W. Ball
*Assistant Examiner*—Todd J. Kilkenny
(74) *Attorney, Agent, or Firm*—Rothwell, Figg, Ernst & Manbeck, p.c.

(57) ABSTRACT

An apparatus for forming a polymeric pressure vessel includes two, coaxial plastic extruders separated by a hole-forming laser and connected to a variable die, a vacuum/blow molding apparatus, a fusing device, a braiding mechanism, and an overcoat applicator. The first extruder forms a tubular core, and the laser forms axially-spaced apertures in the core. The second extruder forms an outer tube coaxially over the tubular core and the variable die is alternately opened and closed to form parisons of increased material at axially-spaced locations along the outer tube. The parisons are moved into the molding apparatus and are expanded in a vacuum/blow molding process into hollow chambers of preferably ellipsoidal shape. The fusing device fuses the outer tube to the tubular core at locations between the spaced-apart hollow chambers, the braiding mechanism then applies a layer of interwoven reinforcing filament fiber, and the overcoat applicator applies a protective polymeric coating over the fiber layer. The entire device is computer-controlled for maximum automated efficiency. The first extruder and the hole-forming laser may be omitted if the inner tubular core is to be omitted from the pressure vessel.

11 Claims, 5 Drawing Sheets

U.S. PATENT DOCUMENTS

| | | |
|---|---|---|
| 4,964,405 A | 10/1990 | Arnoth |
| 5,036,845 A | 8/1991 | Scholley |
| 5,127,399 A | 7/1992 | Scholley |
| 5,323,953 A | 6/1994 | Adderley et al. |
| 5,330,342 A * | 7/1994 | Linss et al. ................. 425/150 |
| 5,435,305 A | 7/1995 | Rankin, Sr. |
| 5,517,984 A | 5/1996 | Sanders |
| 5,529,061 A | 6/1996 | Sanders |
| 5,582,164 A | 12/1996 | Sanders |
| 5,830,400 A | 11/1998 | Huvey et al. |
| 6,047,860 A | 4/2000 | Sanders |
| 6,116,464 A | 9/2000 | Sanders |

* cited by examiner

METHOD FOR FORMING A POLYMERIC CONTAINER SYSTEM FOR PRESSURIZED FLUIDS

FIELD OF THE INVENTION

The present invention is directed to a method and apparatus for forming a reinforced polymeric container system for pressurized fluids. The method and apparatus advantageously employs coaxial multiple extrusion in conjunction with variable die and vacuum forming capability to form continuous lengths of the container system in an efficient, high-quality manner.

BACKGROUND OF THE INVENTION

Figure 1:
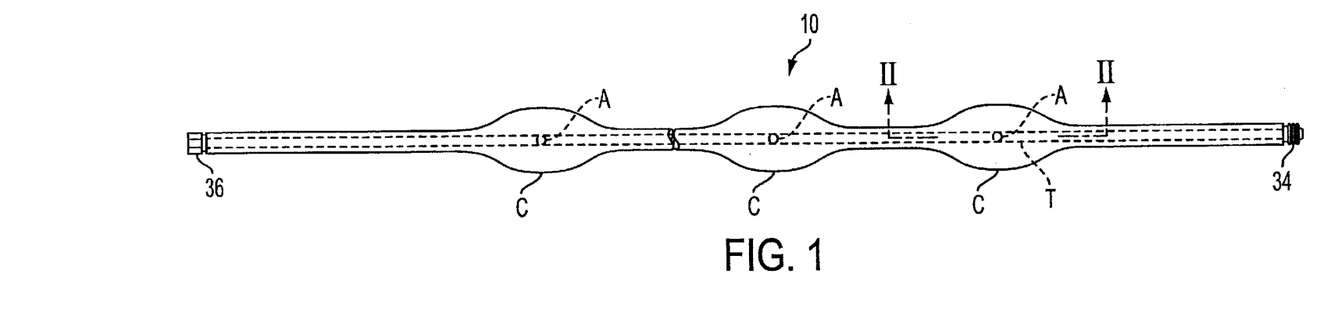
FIG. 1 is a broken side elevational view of a plurality of aligned, rigid, generally ellipsoidal chambers interconnected by a tubular core.

As shown in FIG. 1, U.S. Pat. No. 6,047,860 (the disclosure of which is hereby incorporated by reference) to Sanders, an inventor of the present invention, discloses a container system 10 for pressurized fluids including a plurality of form-retaining, generally ellipsoidal chambers C interconnected by a tubular core T. The tubular core extends through each of the plurality of chambers and is sealingly secured to each chamber. A plurality of longitudinally-spaced apertures A are formed along the length of the tubular core, one such aperture being disposed within each of the interconnected chambers so as to permit infusion of fluid to the interior space of each chamber during filling and effusion of the fluid from the interior space of each chamber during fluid delivery or transfer to another container. The apertures are sized so as to control the rate of evacuation of pressurized fluid from the chambers. Accordingly, a low fluid evacuation rate can be achieved so as to avoid a large and potentially dangerous burst of kinetic energy should one or more of the chambers be punctured (i.e., penetrated by an outside force) or rupture.

The size of the apertures A will depend upon various parameters, such as the volume and viscosity of fluid being contained, the anticipated pressure range, and the desired flow rate. In general, smaller diameters will be selected for gasses as opposed to liquids. Thus, the aperture size may generally vary from about 0.010 to 0.125 inches. Although only a single aperture A is shown in FIG. 1 for each chamber, more than one aperture A can be formed in the tube T within the interior space of the chamber C. In addition, each aperture A can be formed in only one side of the tube T, or the aperture A may extend through the tube T.

The inlet or front end of the tubular core T may be provided with a suitable fitting, such as threaded male fitting 34. The discharge or rear end of a tubular core T may be provided with suitable fitting, such as a threaded female fitting 36. Such male and female fittings provide a pressure-type connection between contiguous strands of assemblies of chambers C interconnected by tubular cores T and provide a mechanism by which other components, such as gauges and valves, can be attached to the interconnected chambers.

The container system 10 is lightweight and robust, and the elongated strand of interconnected chambers can be curved, bent, or otherwise configured to be incorporated into a wearable garment or carryable pack. Examples of such garments and packs are described in U.S. patent application Ser. No. 09/592,902, the disclosure of which is hereby incorporated by reference.

Sanders '860 discloses an apparatus and method for manufacturing the container system 10 whereby each chamber C includes a discreet, generally ellipsoidal shell molded of a suitable synthetic plastic material and having open front and rear ends. The diameters of the open ends are dimensioned so as to snugly receive the outside diameter of the tubular core T. The tubular core T is attached to the shells so as to form a fluid tight seal therebetween. The tubular core T is preferably bonded to the shells by means of light, thermal, or ultrasonic energy, including techniques such as, ultrasonic welding, radio frequency energy, vulcanization, or other thermal processes capable of achieving seamless circumferential welding. The shells may be bonded to the tubular core T by suitable ultraviolet light-curable adhesives. The exterior of the shells and the increments of tubular core T between such shells are wrapped with suitable pressure resistant reinforcing filaments to resist bursting of the shells and tubular core. A protective synthetic plastic coating is applied to the exterior of the filament wrapped shells and tubular core T.

While the construction described in Sanders '860 has proven capable of withstanding pressure of the magnitude encountered in portable oxygen delivery systems, e.g., up to 3000 psi, the manufacturing method described in the patent is rather inefficient. The core tube T must be "threaded" through each individual ellipsoidal shell, and each shell must be separately bonded, at each of its longitudinal ends, to the core tube. Accordingly, it is impractical to manufacture strands of interconnected chambers more than several feet long. Moreover, the method requires bond joints at each end of each shell which completely surround the tubular core. These multiple bond joints are subject to manufacturing defects and, regardless of whether the joint includes a defect each bond joint becomes a stress concentration point when the system 10 is pressurized.

Figure 2:
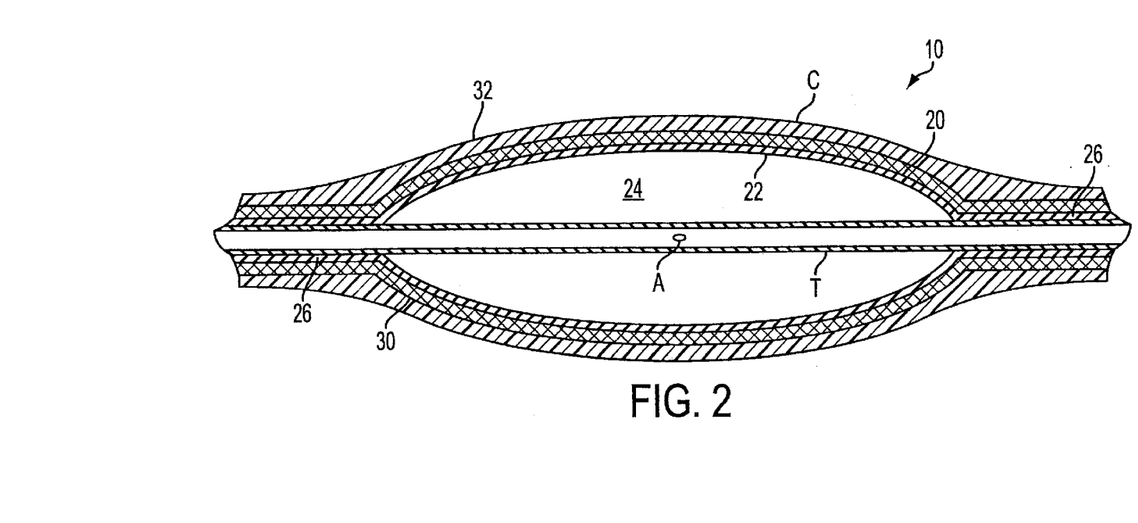
FIG. 2 is an enlarged horizontal sectional view taken along the line II—II in FIG. 1.

As shown in FIG. 2 and described in U.S. patent application Ser. Nos. 09/592,902, 09/592,900, 09/592,904, 09/592,664, 09/592,663, and 09/592,903, the respective disclosures of which are hereby incorporated by reference, the tubular core T can be co-formed along with an outer core 20 having spaced-apart, interconnected shells or chambers 22 and which directly overlies the tubular core. In other embodiments described in the aforementioned patent applications, the tubular core can be omitted, in which case the pressure vessel is comprised of a series of interconnected, hollow chambers.

SUMMARY OF THE INVENTION

The present invention is directed to an apparatus and method for co-forming the tubular core T and outer core 20 shown in FIG. 2 in an automated process. The process and apparatus can be expanded to also form the apertures A in the tubular core T, to apply the reinforcement filament layer, and to apply the outer protective layer. In another embodiment of the present invention, the apparatus and method of the present invention can be employed to form a continuous length of interconnected chambers (with the tubular core omitted), which is covered by a reinforcement filament layer and a protective outer coating.

According to a one aspect of the invention, a method for forming a polymeric pressure vessel comprises forming a preform tube with alternating regions of generally uniform wall thickness and internal dimension and regions of increased wall thickness compared to the wall thickness of the regions of generally uniform wall thickness. Each of the regions of increased wall thickness is expanded into a hollow chamber, which has a maximum internal dimension greater than the internal dimension of the regions of generally uniform wall thickness, thereby forming an expanded tube with a plurality of hollow chambers serially interconnected by connecting sections formed by the regions of generally uniform wall thickness and internal dimension.

According to another aspect of the invention, prior to forming the preform tube, an inner tube of generally uniform wall thickness and internal dimension is formed and a plurality of axially-spaced apertures are formed along the length of the inner tube. Thereafter, the preform tube is formed coaxially over the inner tube, with each of the apertures being located within an associated one of the hollow chambers after the regions of increased wall thickness of the preform tube are expanded into hollow chambers.

According to another aspect of the invention, an apparatus for forming a polymeric pressure vessel comprises an outer tube extruder for driving a fluid polymeric material and forming the fluid polymeric material into an outer tubular member. A variable die is located downstream of the outer tube extruder and is constructed and arranged to alternately increase and decrease in size to thereby alternately increase and decrease the thickness of the wall of the outer tubular member. A molding apparatus is located downstream of the variable die and is constructed and arranged to expand spaced-apart portions of the outer tubular member having greater wall thickness into hollow chambers to thereby form a plurality of serially interconnected hollow chambers.

According to another aspect of the invention, the apparatus may also include an inner tube extruder located upstream of the outer tube extruder for driving a fluid polymeric material and forming the fluid polymeric material into inner tubular member and a hole forming device located between the inner tube extruder and the outer tube extruder and constructed and arranged to form axially spaced-apart apertures in the inner tubular member. The outer tube extruder is a coaxial extruder constructed and arranged to form the outer tubular member coaxially over the inner tubular member.

According to another aspect of the invention, the apparatus may include a fusing mechanism located downstream of the outer tube for fusing the outer tubular member to the inner tubular member at locations between the spaced apart hollow chambers.

According to another aspect of the invention, the apparatus may also include a braiding mechanism located downstream of the fusing mechanism for applying a layer of interwoven reinforcing filament fiber over the plurality of interconnected hollow chambers.

According to another aspect of the invention, the apparatus may include an overcoat applicator located downstream of the braiding mechanism for applying a protective layer of polymeric material over the layer of interwoven reinforcing filament fiber.

Other objects, features, and characteristics of the present invention will become apparent upon consideration of the following description and the appended claims with reference to the accompanying drawings, all of which form a part of the specification, and wherein like reference numerals designate corresponding parts in the various figures.

DETAILED DESCRIPTION OF THE INVENTION

With reference to the figures, exemplary embodiments of the invention will now be described. These embodiments illustrate principles of the invention and should not be construed as limiting the scope of the invention.

A more detailed description of a preferred embodiment of the container system 10 will be provided first.

Referring to FIG. 2, the container system 10 comprises the tubular core T which, in the preferred embodiment, comprises a continuous, substantially cylindrical tubular member of substantially constant inner and outer diameter. Tubular core T is formed from a synthetic plastic, such as Teflon® or fluorinated ethylene propylene. An outer tube 20 is formed over the tubular core T and includes a plurality of longitudinally spaced shell regions 22 connected by connecting sections 26 disposed between adjacent shells 22. The outer tube 20 is preferably also formed of a synthetic plastic material such as Teflon® or fluorinated ethylene propylene. The inner diameter of the connecting sections 26 of the outer tube 20 preferably forms a snug fit with the outer diameter of the tubular core T. The shell 22 has an inside diameter significantly greater than the outside diameter of the tubular core T, thereby defining an interior region 24 wherein fluid under pressure may be stored. The shell 22 may be of any suitable shape, and is preferably a round shape, such as spherical, oval or ellipsoidal, and is most preferably ellipsoidal in shape. Between adjacent shells 22, the connecting sections 26 are fused to the tubular core T to form a fluid tight seal between the connecting sections 26 and the tubular core T to thereby prevent fluid flow into the interface between the connecting sections and the tubular core. As described above, apertures A are formed in the tubular core T at spaced apart locations, preferably one aperture being formed within the interior 24 of each shell 22. For fluid to flow into or out of the interior 24 of each shell 22, at least one aperture must be formed within the interior 24, but more than one aperture may be formed as well.

The exterior surface of the outer tube 20 is wrapped with a suitable reinforcing filament fiber forming a fiber layer 30. The fiber layer 30 may be either a winding or a braid (preferably a triaxial braid pattern having a nominal braid angle of 75°) and is preferably a high-strength aramid fiber material such as Kevlar® (preferably 1,420 denier fibers), carbon fibers, or nylon. Other suitable filament fiber material may include thin metal wire, glass, polyester, or graphite. The reinforcing layer 30 is preferably a Kevlar® winding having a preferred thickness of about 0.035 to 0.055 inches, with a thickness of about 0.045 inches being most preferred. In a preferred configuration, the volume of the interior 24 of each shell 22 is within a range of capacities configurable for different applications, with a most preferred volume of about thirty (30) milliliters. Furthermore, in a preferred configuration, each shell has a longitudinal length of about 3.0–3.5 inches, with a most preferred length of 3.250–3.330 inches, and a maximum outside diameter of about 0.800–1.200 inches, with a most preferred diameter of about 0.095–1.050 inches. The shell 22 has a typical wall thickness ranging from 0.03–0.05 inches with a most preferred typical thickness of about 0.04 inches. The inside diameter of the tubular core T preferably ranges from 0.125–0.300 inches, with a most preferred range of about 0.175–0.250 inches.

The protective outer layer 32 applied over the reinforcing layer 30 protects the reinforcing layer 30 as well as the tubular core T and the outer tube 20 from abrasions, UV rays, thermal elements, or moisture. The protective outer layer 32 is preferably a synthetic plastic coating. Suitable materials includes polyvinyl chloride and polyurethane. The protective outer layer 32 may include a fire retardant additive.

Alternatively, for other pressure vessel applications, the tubular core T can be omitted.

Figure 3A:
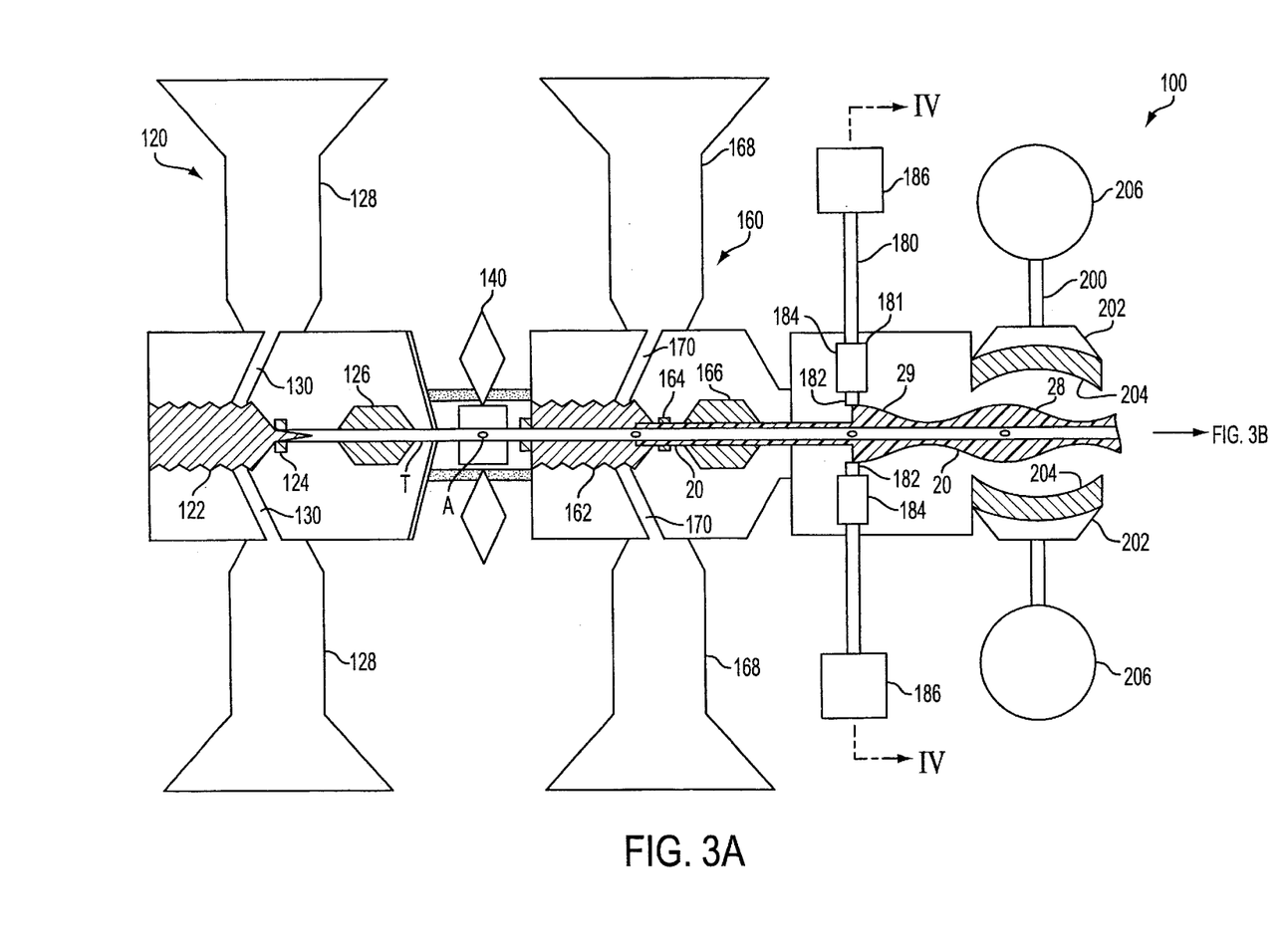
FIG. 3A is a schematic view of a portion of an apparatus for forming a polymeric container system for pressurized fluids according to the present invention.
Figure 3B:
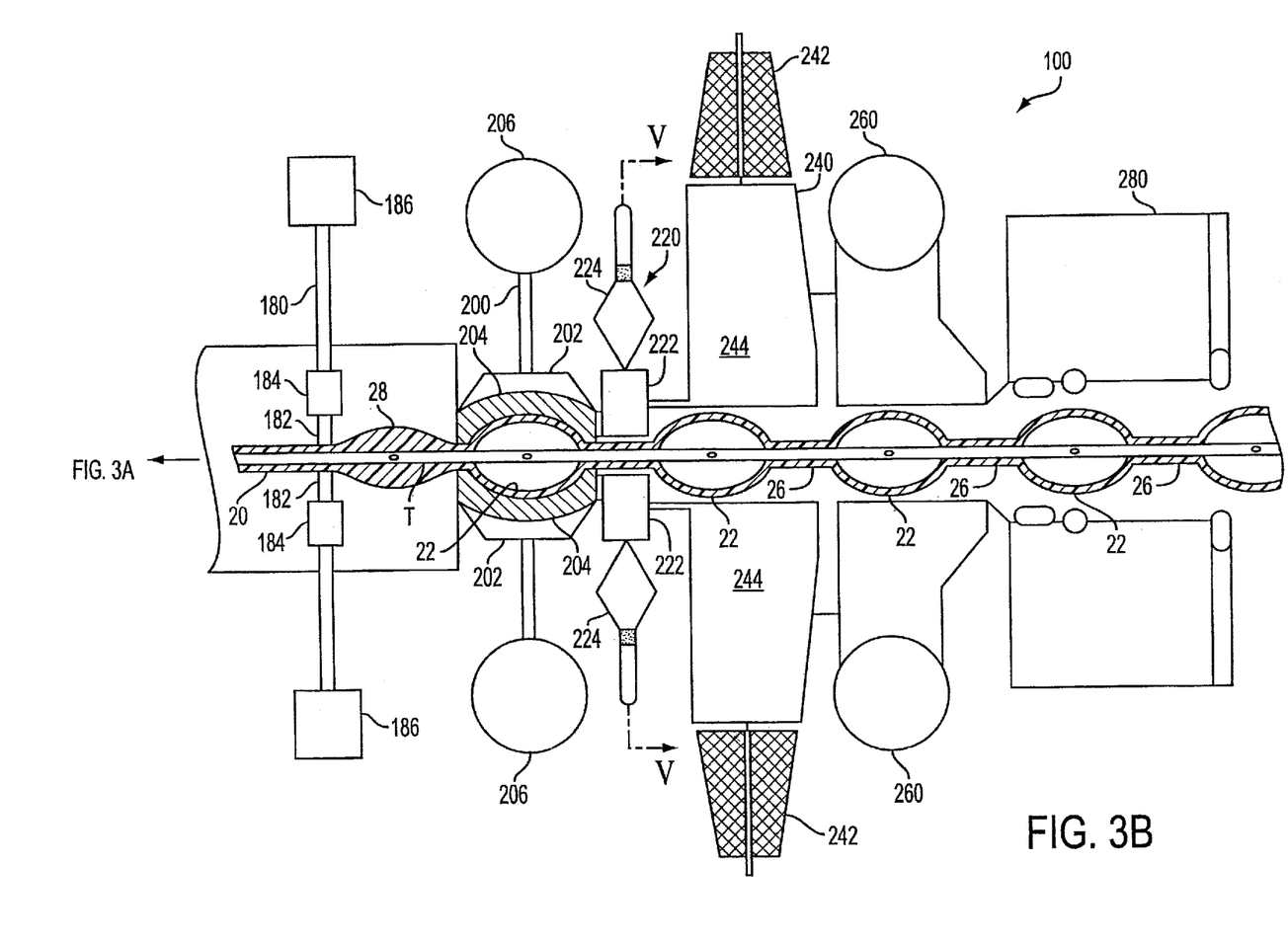
FIG. 3B is a continuation of the same system schematically shown in FIG. 3A.

An apparatus for forming a polymeric, reinforced container system, such as that shown in FIGS. 1 and 2 and described above, is indicated generally by reference number 100 in FIGS. 3A and 3B. FIGS. 3A and 3B represent different portions of the entire apparatus, with some overlap between the two figures as will be described below.

In general, the apparatus 100 includes a tubular core extruder 120 for first forming, by an extrusion process, the tubular core T of the container. An aperture-forming station 140 follows the tubular core extruder 120. The aperture-forming station forms the regularly-spaced apertures A in the tubular core T. An outer tube extruder 160 follows the aperture-forming station 140. The outer tube extruder begins forming the outer tube 20 over the tubular core T by a coaxial coextrusion process. The outer tube 20 is shown in cross-section in FIGS. 3A and 3B, but the tubular core T is not. A variable die station 180 follows the outer tube extruder 160. The variable die station 180 includes a variable diameter die for creating along the outer tube 20 a pre-form 28 as will be described in more detail below. The molding station 200 follows the variable die station 180. The molding station 200 forms the pre-form 28 into the shell 22 of the outer tube 20 by a vacuum/blow molding process. The fusion station 220 follows the molding station 200. The fusion station fuses the connecting sections 26 of the outer tube 20 between adjacent shells 22 to the tubular core T. A braiding station 240 follows the fusion station 220. The braiding station 240 applies a fiber reinforcement layer 30 over the outer tube 20. An overcoat station 260 follows the fusion station 220. The overcoat station 260 applies a protective outer coating 32 over the fiber reinforcing layer.

Referring to FIG. 3A, formation of the container 10 begins at the tubular core extruder 120. The tubular core extruder 120 includes an extruder screw 122 and raw material hoppers 128 which provide raw material, in the form of polymer powder or pellets, to the screw via material feed channels 130. Screw 122 is driven by a suitable motor, which is not shown, as such motors as well as their configuration and coupling with the extrusion screw are well known in the plastic extrusion arts. As is also well known in the plastic extrusion arts, friction within the screw 122 creates heat that converts the raw material powder or pellets into a flowing, molten fluid. If necessary or desired, additional heat may be applied to the raw material by suitable heating elements, such as resistive or infrared heating elements. As the screw 122 rotates to force the fluid plastic material forward (to the right in FIG. 3A), the molten plastic material is driven by the screw through a form die 124 to create an extruded, continuous precision tube T. After passing through the form die 124, the tube T passes through an extrusion die 126. The form die 124 performs final forming of the inner surface of the tube T, and the extrusion die 126 performs final forming of the external surface of the tube T. It is preferable that the form die 124 and the extrusion die 126 provide rapid die changing capability so that dies of different diameters can be easily installed into the tubular core extruder 120 to provide a tubular core of variable size as desired. Of course, variations in the size of the tubular core T must be accounted for when forming the outer tube 20 later in the process. For example, the tube wall of the tubular core may be made thinner where more flexibility of the overall container 10 is required and may be made thicker where higher strength is required. Any changes made to the tubular core dimensions must be accounted for by the outer tube extruder.

Progressing downstream from the tubular core extruder 120, the tubular core T passes through the aperture forming station 140. A stamping, spraying, or other application mechanism is used to tag, or mark, locations on the tube T where the apertures A are to be formed with a reflective dye. A gas type laser (not shown) applies a high-energy (preferably 2000 Wats) laser beam at the tubular core T. The laser passes through the unmarked portions of the tubular core T without changing the material matrix, but when it contacts the reflective dye of the marked locations, the beam superheats the tubular wall material thereby penetrating the tube and creating the aperture. The laser creates a fine, smooth, debris-free aperture. Other aperture forming mechanisms may be used, such as a mechanical punch or a drill, but such devices do not form as clean an aperture as does a laser and, moreover, such devices can cause debris that will become trapped inside the tubular core T.

The tubular core T next passes through the outer tube extruder 160. The outer tube extruder 120 includes a screw 162 through which the tubular core T passes coaxially. Raw material hoppers 168 provide raw material, in the form of polymer powders or pellets to the screw 162 by means of feed channels 170. Friction within the screw 162 heats and melts the raw material powder to form a molting raw material. Additional heat may optionally be provided by means of additional heating elements, such as resistive or infrared elements. The screw 162 is driven by a suitable motor, which is not shown as such motors as well as their configuration and coupling with the extrusion screw are well-known in the plastic extraction arts. The screw 162 forces the molten plastic raw material through a form die 164 which forms the inner surface of the outer tube 20 (shown in cross-section in FIGS. 3A and 3B). The outer tube 20 then passes through the extrusion die 166, which forms the outer surface of the outer tube 20.

Figure 4:
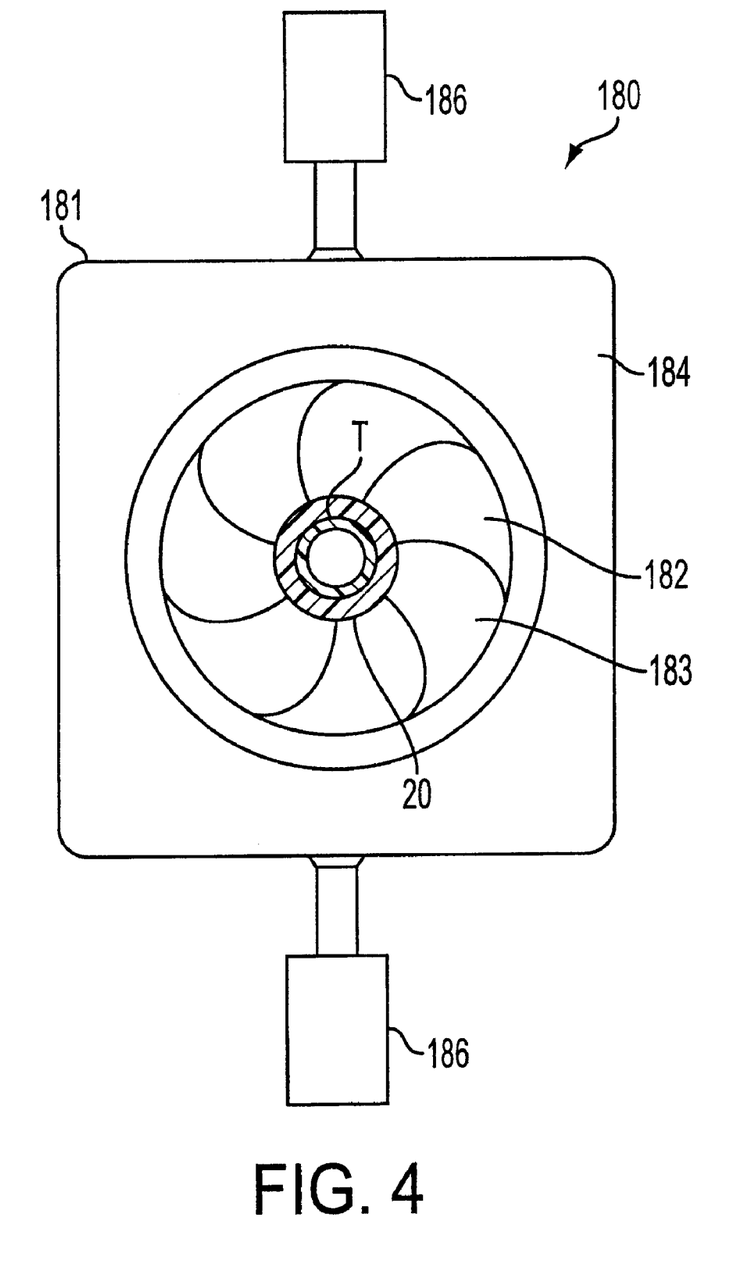
FIG. 4 is a section view taken along line IV—IV in FIG. 3A.
Figure 5:
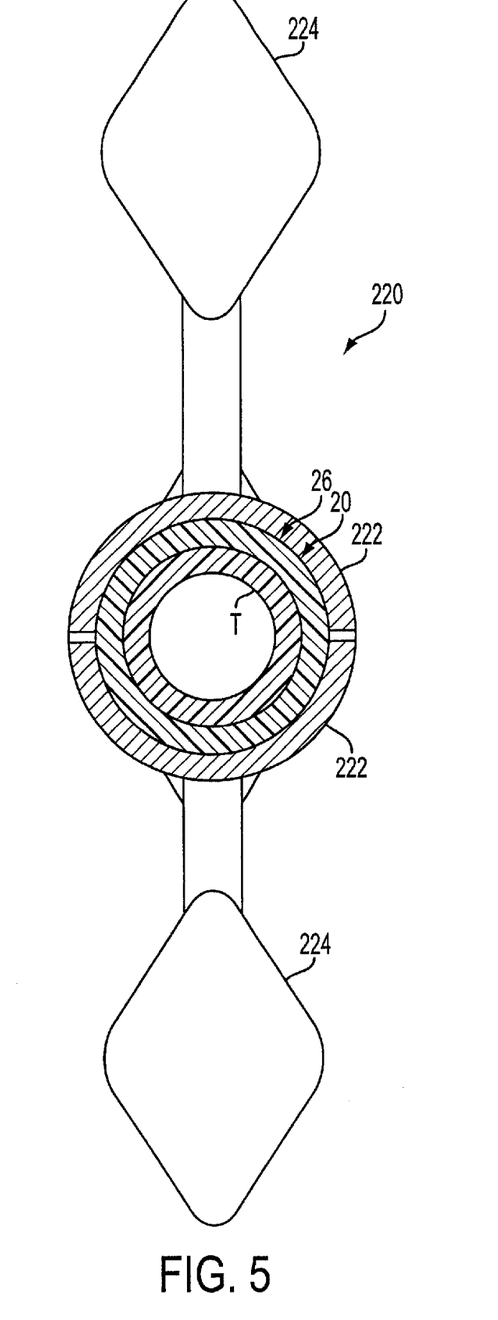
FIG. 5 is a sectional view taken along V—V in FIG. 3B.

The tubular core T and the coaxially-formed outer tube 20 proceed from the outer tube extruder 160 into the variable die station 180. The variable die station includes a variable die 181 (see FIG. 4) that includes a variable die iris formed from a plurality of discreet die segments 183 and mounted in a die mount and support block 184. The die segments 183, actuated by an iris actuating mechanism (not shown) that is powered by power units 186 move radially inwardly and outwardly to alternatively decrease and increase the area of the opening through the variable die 181. As the tubular core T and the outer core 20 pass through the variable die station 180, the variable die iris 182 alternatively opens and then closes to vary the thickness of the molting plastic material deposited on the outside of the tubular core T. As the iris 182 is opened, an area of increased thickness, as indicated at 29, is formed on the tubular core T. As the outer tube 20 and tubular core T continue to proceed, the iris 182 again closes to decrease the thickness of the molten material thereby forming a preform 28 on the tubular core T. At this stage, the outer tube 20 with a preform 28 formed thereon will be referred to as the preform tube. In a preferred embodiment, the preform 28 is generally ellipsoidal in shape.

The preform tube, that is, outer tube 20, including the preform 28, and the tubular core T next proceed into the molding station 200. The molding station 200 is a vacuum and blow mold apparatus that uses a blowing agent, e.g., air or nitrogen, with nitrogen being preferred to expand the preform 28, which is, in effect, a parison of molten polymeric material. The molding station also includes a two-piece mold formed by molding horns 202, each having a respective mold surface, or insert, 204 that is preferably interchangeable so that different sizes and shapes can be achieved. The molding horns 202 can be moved together or part by actuating mechanism 206 (e.g., hydraulically or pneumatically).

The molding horns 202 are initially in an open configuration to permit the enlarged perform 28 to move into position between the horns 202. With the preform 28 moved into position between the molding horns 202, the forward progress of the tubular core T and outer core 20 is momentarily halted, and the molding horns 202 are then moved toward one another to close onto the preform 28 for the subsequent vacuum/blow molding process. As shown in FIG. 3B, after the molding horns 202 are closed onto the preform 28, a blowing agent is injected into the outer core T under pressure, and, simultaneously, a vacuum is applied inside the molding space formed by the close molding horns 202. The blowing agent exits the aperture A between the molding horns 202, and the combination of the internally applied blowing agent under pressure and the external vacuum causes the preform 28 (i.e., the parison) to expand into a hollow chamber 22 having a shape conforming to that of the mold cavity inserts 204. After the hollow chamber 22 has been formed, the molding horns 202 thereafter move apart so as to permit the chamber 22 to proceed out of the molding station 200. The cooling effect of the blowing agent causes the molten material to cool so that the hollow chamber 22 retains its shape after the molding horns 202 are moved apart. At this stage, the outer tube 20, with the expanded hollow chambers 22 formed thereon, will be referred to as an expanded tube.

The fusion station 220 is a fusing mechanism that includes a pair of fusion horns 222 that are moved toward and away from one another by an actuation system 224. While movement of the tubular core T and outer core 20 is momentarily halted while a hollow chamber 22 is being formed in the molding station 200, the fusion horns 222, each having a generally semi-cylindrical shape, are closed toward one another over the connecting portion 26 of the outer tube 20 between the hollow chamber 22 being formed in the molding station 200 and the previously formed hollow chamber 22. The fusion horns 222 are sized and shaped so as to closely conform to the outer diameter of the connecting section 26, thereby applying radial pressure of, e.g., 20 psi, onto the outer tube 20. The fusion horns 222 are heated (e.g., by resistive or infrared elements), thus causing the tubular core T and the outer tube 20 to fuse together at the connecting section 26.

After the hollow chamber 22 is formed and the tubular core T and outer tube 20 are fused together at the connecting section 26, the molding horns 202 and the fusion horns 222 both open so as to permit the assembly to proceed through the apparatus. The fusion joints at connecting sections 26 strengthen the overall pressure chamber and prevent gas leakage between the hollow chambers 22 of the outer core 20 and the tubular core T.

The assembly is then moved through the braiding station 240. The braiding station 240 includes spindles 242 on which is stored the reinforcing filament and a spinneret braider 244 that applies a weave or braid of the reinforcing filament over the connecting sections 26 and hollow chambers 22 to form a layer of interwoven filament fiber. In the preferred embodiment, the braiding station 240 includes up to forty two (42) spindles. It may be desirable to heat, and thereby soften, the outer surface of the outer tube 20 so that when the reinforcing format is applied onto the outer tube, it becomes partially embedded into the outer surface of the outer tube. This will eliminate thread slippage that can lead to sagging. As in conventional braiding mechanisms, as the braider 244 rotates around the assembly, it feeds the filament threads from the spindles 242 onto the outer tube 20.

After the overbraided reinforcement is complete, the braided assembly is passed through the high temperature overcoat station 260.

As the braided assembly passes through the overcoat station 260, which typically includes raw material containers, an applicator, and a dryer, the braided assembly is sprayed with a high temperature plastic spray in the form of a light plastic powder applied under pressure. The spray, which may also be a liquid spray, is applied over 360 degrees around the assembly so that the assembly need only pass through the overcoat station once. The coating material is preferably a polyurethane or ABS material. The assembly, with the powder coating sprayed on, then passes through a heating system that fuses the powder into a homogenous skin. The heating elements of the overcoat station 260 may comprise electric radiators or infrared heaters. If the overcoat material is a sprayed liquid, the heater is not necessary.

As the assembly continues through the overcoat station 260, it is dried using high pressure refrigerated air.

The apparatus includes a process control and management system 280. The system measures and calibrates the final assembly throughout the different stations. The measuring devices are disposed along the extrusion line 100 so as to monitor various parameters of importance to the integrity of the final assembly. Measuring devices such as laser measuring devices, potentiometers, mechanical measuring devices, and thermocouples measure such parameters as temperatures, tube diameter, tube thickness, chamber length, layer thicknesses, etc. The program management system also controls the material feed rates and the temperatures as well as the die speeds and pressures. The process controller is preferably linked to a microprocessor, such as a computer, thereby making the machine fully automated.

If a container system without the tubular core T is to be manufactured, the tubular core extruder 120 and the aperture forming station 140 may be omitted. Moreover, the outer tube extruder 160 need not be capable of coaxial extrusion.

Because the system of the present invention uses a continuous extrusion technique, it produces finished parts without a parting line compressional seam, a likely failure point in other blow-molded parts. The continuous extrusion technique also eliminates the excess material associated with flash at the parting line.

Since every chamber is joined to the tube, when the unpressurized assembly is flexed, the core tube absorbs most of the bending load that would otherwise be transmitted to the chambers. This results in minimal deformation at the chambers even when the system itself, and the internal core, bend significantly. The core tube, with its smaller internal diameter, is more structurally sound than the external chambers and can withstand a larger bending angle. Thus the core tube minimizes chamber deformation, even when the system is flexed at low pressure (when significant deformation is possible). Minimizing chamber deformation also prevents the outside reinforcing braid from shifting and bagging, which can cause system failure.

While the invention has been described in connection with what are presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed is:

1. A method for forming a polymeric pressure vessel comprising:

forming an inner tube of generally uniform wall thickness and internal dimension and forming a plurality of axially-spaced apertures along the length of said inner tube;

forming a preform tube over said inner tube, said preform tube having alternating regions of generally uniform wall thickness and internal dimension and regions of increased wall thickness compared to the wall thickness of the regions of generally uniform wall thickness, wherein at least one of said plurality of apertures is disposed within each of said regions of increased wall thickness; and expanding each of the regions of increased wall thickness into a hollow chamber, said expanding including applying a gas under pressure into said inner tube so that gas exiting each of said plurality of apertures generates an expanding force within each of said regions of increased thickness, each hollow chamber having a maximum internal dimension greater than the internal dimension of the regions of generally uniform wall thickness, thereby forming an expanded tube with a plurality of hollow chambers serially interconnected by connecting sections formed by the regions of generally uniform wall thickness and internal dimension.

2. The method of claim 1, wherein said regions of increased wall thickness are formed so as to have a generally ellipsoidal shape.

3. The method of claim 1, further comprising fusing portions of said inner tube and said expanded tube together at locations between said hollow chambers.

4. The method of claim 3, wherein said fusing is accomplished by applying heat and radial pressure to an outer surface of portions of said expanded tube.

5. The method of claim 1, wherein said hollow chambers are formed so as to have a generally ellipsoidal shape.

6. The method of claim 1, further comprising applying a layer of reinforcing filament fiber over said expanded tube.

7. The method of claim 6, further comprising applying a protective overcoat layer over said layer of reinforcing filament fiber.

8. The method of claim 6, wherein said layer of reinforcing filament fiber is applied by a braiding mechanism for wrapping filament thread about an outer surface of said expanded tube in an interwoven manner.

9. The method of claim 1, wherein said perform tube is formed by an extruder which forces a fluid polymeric material through a variable die mechanism that alternately increases and decreases its size to form the regions of increased wall thickness and said expanded tube is formed by a molding apparatus that forms the hollow chambers by application of an internal pressure and an external vacuum to expand the fluid polymeric material into conformance with a mold surface.

10. The method of claim 1, wherein said inner tube is formed by an extruder and said preform tube is formed by a coaxial extruder which forces a fluid polymeric material through a variable die mechanism that alternately increases and decreases its size to form the regions of increased wall thickness and said expanded tube is formed by a molding apparatus that forms the hollow chambers by application of an internal pressure and an external vacuum to expand the fluid polymeric material into conformance with a mold surface.

11. The method of claim 1, wherein said inner tube is formed by an extruder, and said apertures are formed by applying a reflective dye onto said inner tube and thereafter directing a laser beam at the wall of the inner tube in the vicinity of the reflective dye, wherein the reflective dye causes the laser to form an aperture in the wall of the inner tube substantially only where the dye is applied on the inner tube.

* * * * *